United States Patent [19]

Eberhard

[11] Patent Number: 5,473,689
[45] Date of Patent: Dec. 5, 1995

[54] METHOD FOR AUTHENTICATION BETWEEN TWO ELECTRONIC DEVICES

[75] Inventor: Günther Eberhard, Eichenau, Germany

[73] Assignee: Siemens Aktiengesellschaft, Munich, Germany

[21] Appl. No.: 248,657

[22] Filed: May 25, 1994

[30] Foreign Application Priority Data

May 25, 1993 [DE] Germany .......................... 43 17 380.2

[51] Int. Cl.$^6$ ................................ H04L 9/32; H04L 9/00
[52] U.S. Cl. ................ 380/23; 380/24; 380/25; 380/46; 380/49; 235/379; 235/380; 340/825.31; 340/825.34
[58] Field of Search .................................. 380/23–25, 4, 380/46, 49, 50; 235/380, 379; 340/825.34, 825.31

[56] References Cited

U.S. PATENT DOCUMENTS

| | | | |
|---|---|---|---|
| 3,761,892 | 9/1973 | Bosnyak et al. | 235/382 |
| 4,465,153 | 8/1984 | van de Pas et al. | 380/47 |
| 4,679,236 | 7/1987 | Davies | 380/23 |
| 4,799,061 | 1/1989 | Abraham et al. | 340/825.34 |

OTHER PUBLICATIONS

Königs, H.-P. "Cryptographic Identification Methods for Smart Cards in the Process of Standardization." IEEE Communications Magazine, vol. 29, No. 6. (Jun. 1991), pp. 42–48.

Ferreira, R. C. "The Smart Card: A high security tool in EDP." Philips Telecommunications & Data Systems Review, vol. 47, No. 3 (Sep. 1989), pp. 1–19.

*Primary Examiner*—Bernarr E. Gregory
*Attorney, Agent, or Firm*—Herbert L. Lerner; Laurence A. Greenberg

[57] ABSTRACT

A method for authentication between two electronic devices includes generating at least two random numbers; transmitting the two random numbers, so that both are available in both a first and a second station; encrypting the random numbers in both stations to make one cryptogram belonging to each random number; transmitting part of a first cryptogram from one station to the other station; comparing the cryptogram part in the second station, and discontinuing further output of the cryptogram if there is not a match; transmitting part of a second cryptogram by the second station; and comparing the cryptogram part transmitted by the second station, in the first station, and discontinuing further output of the cryptogram if there is not a match. The steps of transmitting part of the first cryptogram from one station to the other station, comparing the cryptogram part in the second station, and discontinuing further output of the cryptogram if there is not a match, transmitting part of the second cryptogram by the second station, and comparing the cryptogram part transmitted by the second station, in the first station, and discontinuing further output of the cryptogram if there is not a match, are repeated with further parts of the cryptogram until a complete match is found, or until discontinuation has taken place.

6 Claims, 2 Drawing Sheets

METHOD FOR AUTHENTICATION BETWEEN TWO ELECTRONIC DEVICES

BACKGROUND OF THE INVENTION

FIELD OF THE INVENTION

The invention relates to a method for authentication between two electronic devices, such as data stations.

One such method is known, for instance, from U.S. Pat. No. 3,761,892. In such a system, data are transmitted from one station to the other, and then the datum is encrypted with a code key by the second data station to make a cryptogram and is finally sent back to the first data station. The first station checks whether or not the cryptogram is correct, that is whether or not the code key known to the first station was used, which means that the data station is accordingly authorized access.

U.S. Pat. No. 3,761,892 explains that it is highly desirable for the system to remain inoperative until such time as the complete data set/cryptogram has been transmitted, even if the first part, or some other part, of the cryptogram does not match an authorized cryptogram. Proceeding in that way is surely appropriate for some kinds of data stations, but in the case of portable chip cards, for instance, that kind of complete transmission of the cryptogram can mean that a non-legitimate user with a valid card could observe the transmission of authentication procedures using his or her own equipment, and could finally simulate a valid card from the data learned.

SUMMARY OF THE INVENTION

It is accordingly an object of the invention to provide a method for authentication between two electronic devices, which overcomes the hereinafore-mentioned disadvantages of the heretofore-known methods of this general type and which makes simulation by a perpetrator or imposter substantially more difficult.

With the foregoing and other objects in view there is provided, in accordance with the invention, a method for authentication between two electronic devices, which comprises:

a) generating at least two random numbers;

b) transmitting the two random numbers, so that both are available in both a first and a second station;

c) encrypting or encoding the random numbers in both stations to make one cryptogram belonging to each random number;

d) transmitting part of a first cryptogram from one station to the other station;

e) comparing the cryptogram part in the second station, and discontinuing further output of the cryptogram if there is not a match;

f) transmitting part of a second cryptogram by the second station;

g) comparing the cryptogram part transmitted by the second station, in the first station, and discontinuing further output of the cryptogram if there is not a match; and h) repeating steps d) through g) with further parts of the cryptogram until a complete match is found, or until discontinuation has taken place.

In accordance with another mode of the invention, there is provided a method which comprises generating the first random number in the first station and transmitting the first random number to the second station, and generating the second random number in the second station and transmitting the second random number to the first station.

In accordance with a further mode of the invention, there is provided a method which comprises continuing to internally output random sequences to the outside from both stations, if the authentication procedure is discontinued, for preventing a point of discontinuation in a bit stream from being ascertained from the outside.

In accordance with an added mode of the invention, there is provided a method which comprises configuring one station as a portable data carrier, such as a chip card, and the other station as a read/write station.

In accordance with a concomitant mode of the invention, there is provided a method which comprises blocking the card upon a predetermined number of errors counted by an error counter in the portable data carrier.

One advantage of the invention is that during the authentication between the electronic devices to be undertaken in alternating steps in accordance with the invention, if an offense is attempted, further output can be blocked at the very outset of the procedure as a result of a non-match of the individual step information that is to be compared. As a result, no useful data is disclosed to the offender. This increases the likelihood that no information which would be valuable for fraudulent purposes will be divulged by means of a compulsory protocol, in which the authentication procedure can be discontinued with great certainty after even only a few attempts, and the use of the card can also be prohibited.

Another advantage of the method of the invention is that the authentication can be performed at relatively little effort or expense, and therefore the data stations do not require very high computer capacity, because there is little potential for commission of an offense. This also proves especially advantageous when a chip card is used as one of the data stations.

Other features which are considered as characteristic for the invention are set forth in the appended claims.

Although the invention is illustrated and described herein as embodied in a method for authentication between two electronic devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing.

DESCRIPTION OF THE PREFERRED EMBODIMENTS

Figure 1:
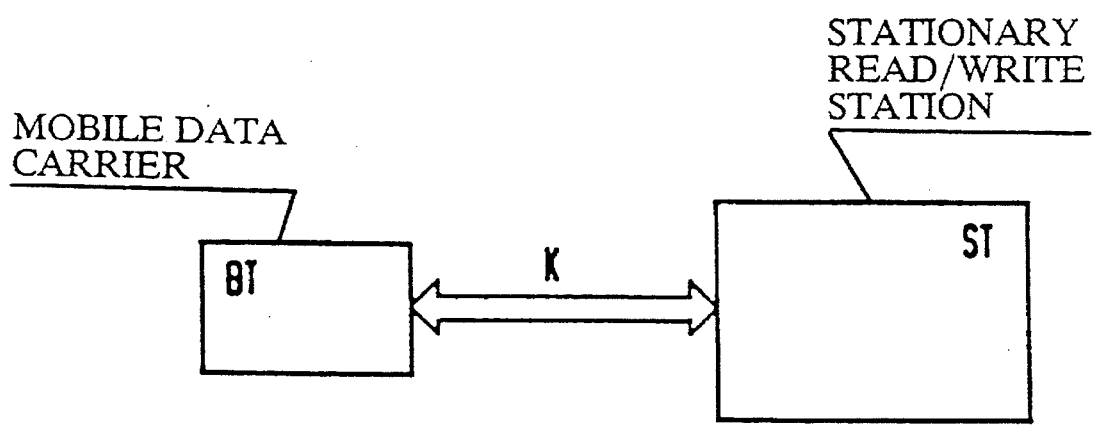
FIG. 1 is a block diagram of a configuration which will be used below to explain the method according to the invention.
Figure 2:
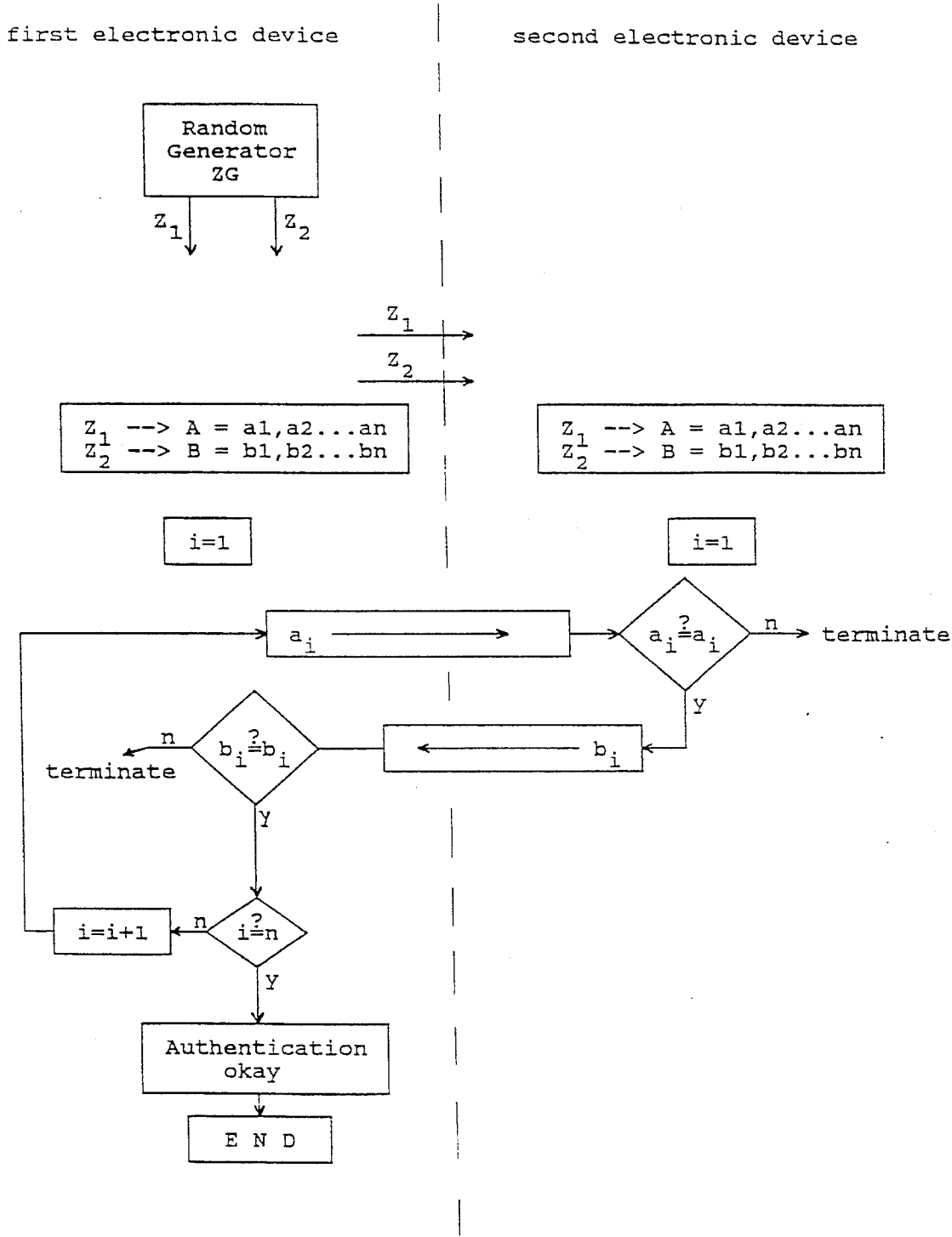
FIG. 2 is a flow diagram of the inventive method.

Referring now to the single figure of the drawing in detail, there is seen a configuration with two data stations BT, ST and a coupling device K for data transmission between the data stations. A configuration of this kind may be used both for authentication procedures of the prior art and for that of the invention.

The conventional method of authentication will be described below, by taking the transmission between a mobile data carrier BT and a stationary read/write station ST as an example: First, the stationary station ST generates a random number R and transmits this random number R over the coupling means K to the mobile data carrier BT, which by way of example may be a chip card. Next, the stationary station ST encrypts the random number R with a secret key GS. The mobile data carrier BT receives the random number R and encrypts it with the secret key GS, which is also stored in memory in the mobile data carrier BT. The cryptogram thus obtained is then retransmitted over the coupling means K to the stationary station ST. The stationary station ST receives the cryptogram and compares it with its own calculated cryptogram. If the two match, then the mobile data carrier is recognized as genuine.

Conversely, a similar method may be employed for authentication of the terminal, but in that case the cryptogram of the stationary station is transmitted to the mobile data carrier, and the comparison is performed in the mobile data carrier.

As was already noted above, in the described sequence of mutual authentication, the mobile data carrier may be induced by some interrogating electronic device, such as the wrong terminal, to output a cryptogram that is associated with some information which is to be entered. When the key is small for reasons of expense, an offender can certainly discover the associated secret key by continuously varying the keys. This is known as a selective clear-text offense. If the sequence of authentication is transposed, then it is possible, for instance with the aid of a dummy card as the mobile station, to cause a genuine read/write station to output the cryptogram that is sought, which belongs to the information that is to be entered.

Using a global key in the checking station is no protection in such a case, because the identifier ID or CID, to be output from the card, which contains the encrypted secret, must be output by the card prior to the authentication and is thus accessible to an offender.

In the method of the invention, the procedure is therefore performed in the following steps:

Since the secret is known to both sides (optionally after the identifier has been transmitted), the possibility exists of calculating the authentication cryptograms simultaneously. The stationary station ST, for instance, can then generate a random number R1 and transmit it to the mobile data carrier BT. The mobile data carrier BT receives the random number R1 and generates and transmits a second random number R2 to the stationary station ST, and both of them, that is the mobile data carrier BT and the stationary station ST, encrypt both random numbers R1, R2 with a secret key GS. The cryptogram thus obtained is subdivided, by both the mobile data carrier BT and the stationary station ST, into a plurality of arbitrary parts. This subdivision may be so extensive that the cryptogram is subdivided into its individual bits. The mobile part BT then transmits the first part of the cryptogram of the random number R1 to the stationary station. The stationary station ST receives the first part of the cryptogram of the random number R1 and compares it with its own cryptogram part of the random number R1. The stationary station then sends the first part of the cryptogram of the random number R2 to the mobile data carrier BT. The mobile data carrier BT receives the first part of the cryptogram of the random number R2 and compares it with its own cryptogram part of the random number R2. The process is then repeated with the various other parts of the cryptogram.

If the information steps that are to be compared do not match, then further output of the cryptogram is blocked in some suitable way. If an attempt at fraud is made, the first bit or bits of the authentication will already not match, and thus, depending on the chosen number of steps, the fact that the respective part of a cryptogram has been output will hardly be of any use to the perpetrator or criminal.

The starting step can originate at either the stationary station or the mobile data carrier and depends on where the threat is greatest. The procedure may also be combined with an error counter, for final blocking of the card.

It may also be provided that if the authentication procedure is discontinued, other random sequences are output, so that the point of discontinuation in the bit stream cannot be ascertained from outside.

I claim:

1. A method for authentication between first and second electronic devices, which comprises the steps of:

a) generating at least a first and a second random number;

b) transmitting the first and second random numbers so that both numbers are available in each of first and second electronic devices;

c) encrypting the first random number to form a first cryptogram and encrypting the second random number to form a second cryptogram in the first and second electronic devices, each of the first and second cryptograms consisting of n parts, whereby n is an integer of two or greater;

d) defining a counting index i=1;

e) transmitting an ith part of the first cryptogram from the first to the second electronic device;

f) comparing, in the second electronic device, the ith part of the first cryptogram transmitted in step e) with the ith part of the first cryptogram present in the second electronic device;

g) terminating the method for authentication if step f) does not result in a match, or continuing with step h) if step f) results in a match;

h) transmitting an ith part of the second cryptogram from the second to the first electronic device;

i) comparing, in the first electronic device, the ith part of the second cryptogram transmitted in step h) with the ith part of the second cryptogram already present in the first electronic device;

j) terminating the method for authentication if step i) does not result in a match, or continuing with step k) if step i) results in a match;

k) ascertaining whether i=n;

l) concluding the method for authentication if i=n, or continuing with step m) if i<n; and m) defining i=i+1 and continuing at step e).

2. The method according to claim 1, which comprises generating the first random number in the first station and transmitting the first random number to the second station, and generating the second random number in the second station and transmitting the second random number to the first station.

3. The method according to claim 1, which comprises configuring one station as a portable data carrier, and the other station as a read/write station.

4. The method according to claim 3, which comprises configuring the portable data carrier as a chip card.

5. The method according to claim 4, which comprises blocking the card upon a predetermined number of errors counted by an error counter in the chip card.

6. A method for authentication between first and second electronic devices, which comprises the steps of:

a) generating at least one first and one second random number;

b) transmitting the first and second random numbers so that both numbers are available in each of first and second electronic devices;

c) encrypting the first random number to form a first cryptogram and encrypting the second random number to form a second cryptogram in the first and second electronic devices, each of the first and second cryptograms consisting of n parts, whereby n is an integer of two or greater;

d) defining a counting index i=1;

e) transmitting an ith part of the first cryptogram from the first to the second electronic device;

f) comparing, in the second electronic device, the ith part of the first cryptogram transmitted in step e) with the ith part of the first cryptogram present in the second electronic device;

g) if step f) does not result in a match, omitting steps h)-m) and continuing with step n);

h) transmitting an ith part of the second cryptogram from the second to the first electronic device;

i) comparing, in the first electronic device, the ith part of the second cryptogram transmitted in step h) with the ith part of the second cryptogram already present in the first electronic device;

j) if step i) does not result in a match, omitting steps k)-m) and continuing with step n);

k) ascertaining whether i=n;

l) concluding the method for authentication if i=n, or continuing with step m) if i<n;

m) defining i=i+1 and continuing at step e); and n) outputting arbitrary random numbers instead of further parts of the cryptograms, so that a point of termination due to a comparison which did not result in a match may not be ascertained from the outside.

\* \* \* \* \*